P. H. Jackson,

Cable Stopper.

No. 21,135.            Patented Aug. 10, 1858.

Witnesses
Lemuel W. Serrell
Thomas G. Harold

Peter H. Jackson

UNITED STATES PATENT OFFICE.

PETER H. JACKSON, OF NEW YORK, N. Y.

CABLE-STOPPER.

Specification of Letters Patent No. 21,135, dated August 10, 1858.

*To all whom it may concern:*

Be it known that I, PETER H. JACKSON, of the city and State of New York, have invented, made, and applied to use a certain new and useful Improvement in Cable-Stoppers; and I do hereby declare that the following is a full, clear, and exact description of the construction and operation of the same, reference being had to the annexed drawing, making part of this specification, wherein—

Figure 2:
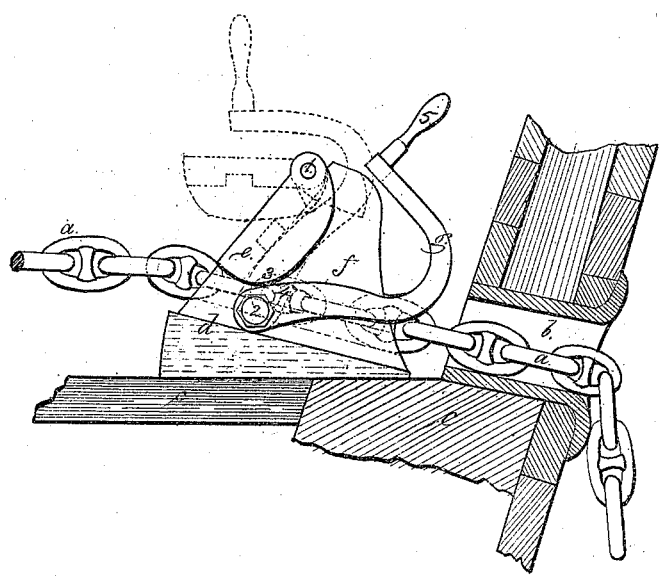
Figure 1:
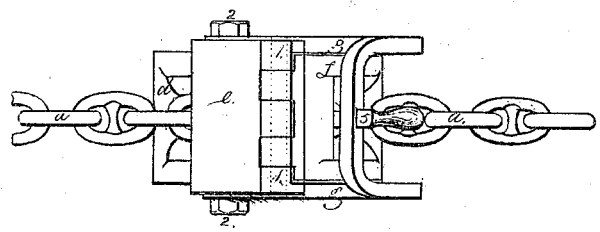

Figure 1, is a plan, and Fig. 2, is a side view of my cable stopper as in use, the bulwarks of the vessel being shown in section.

Similar marks of reference denote the same parts.

$a$, is the chain cable passing through the hawser pipe $b$, in the bulwarks $c$, as usual, $d$, is a grooved plate over which the chain passes, and said plate has vertical flanges at its sides connected at their upper ends at which point the pawl $e$, is attached by a hinge 1, 1. This pawl hangs down and drops behind each alternate link as the cable is drawn in, retaining the same, and preventing the chain fleeting or slipping back from the windlass. This device thus far has before been used, my invention therefore does not consist in the same; but in the use of these stoppers there is found to be a practical difficulty in raising the pawl $e$, with any weight of chain outside the hawser pipe, and this is often a sorce of great inconvenience and danger because it is sometimes necessary to give out more chain to make the anchor hold properly, and sometimes at sea to prevent the chain parting by giving out a little cable when a heavy sea or storm strikes the ship.

To effect the foregoing purpose of raising the pawl $e$, when under strain by the weight or tension of the chain, I make use of the double cam levers $g$ attached at 2, 2, to the flanges $f$, and united to each other at the handle 5. The shape and position of these cam levers is such that the cam shaped sides 3, 3, of the pawl $e$, come in contact with the cam parts 4, 4, of the levers $g$ near their fulcrums 2, 2, so that the power exerted to start the pawl $e$ is very great, but as said pawl rises the levers $g$ come in contact therewith nearer to the hinge 1, increasing the speed of movement in the pawl, but lessening the leverage, and said pawl assumes the position shown by dotted lines, when it can be either thrown over onto the flanges $f$, or allowed to descend again and take the chain; I am thus enabled to let out chain at any time irrespective of the strain in the pawl $e$.

I do not claim a hinged chain stopper as this has before been used, but

What I claim as my invention and desire to secure by Letters Patent, is—

The combination of the cam lever or levers $g$ with the hinged pawl $e$, in the manner and for the purposes substantially as specified.

In witness whereof I have hereunto set my signature this twenty first day of July 1858.

PETER H. JACKSON.

Witnesses:
LEMUEL W. SERRELL,
THOMAS G. HAROLD.